United States Patent
Dolog et al.

(10) Patent No.: US 10,316,142 B2
(45) Date of Patent: Jun. 11, 2019

(54) POLYMERIC COMPOSITES AND ARTICLES FORMED THEREOF

(71) Applicants: Rostyslav Dolog, Houston, TX (US); Juan Carlos Flores, The Woodlands, TX (US); Darryl Ventura, Houston, TX (US); Valery N. Khabashesku, Houston, TX (US)

(72) Inventors: Rostyslav Dolog, Houston, TX (US); Juan Carlos Flores, The Woodlands, TX (US); Darryl Ventura, Houston, TX (US); Valery N. Khabashesku, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 229 days.

(21) Appl. No.: 15/253,030

(22) Filed: Aug. 31, 2016

(65) Prior Publication Data

US 2018/0057633 A1    Mar. 1, 2018

(51) Int. Cl.
| | |
|---|---|
| E21B 33/12 | (2006.01) |
| C08L 61/16 | (2006.01) |
| C08K 9/04 | (2006.01) |
| C08G 65/40 | (2006.01) |
| C08G 65/48 | (2006.01) |
| C08K 3/04 | (2006.01) |
| C08K 3/34 | (2006.01) |
| C08K 3/36 | (2006.01) |

(52) U.S. Cl.
CPC ......... *C08G 65/4056* (2013.01); *C08G 65/48* (2013.01); *C08K 3/04* (2013.01); *C08K 3/346* (2013.01); *C08K 3/36* (2013.01); *E21B 33/12* (2013.01); *C08G 2190/00* (2013.01)

(58) Field of Classification Search
CPC combination set(s) only.
See application file for complete search history.

(56) References Cited

U.S. PATENT DOCUMENTS

| | | | |
|---|---|---|---|
| 2009/0036605 A1 | 2/2009 | Ver Meer | |
| 2011/0139466 A1* | 6/2011 | Chen | C08G 65/48 166/387 |
| 2013/0096245 A1 | 4/2013 | Nair et al. | |
| 2015/0344688 A1 | 12/2015 | Drake et al. | |
| 2016/0230494 A1 | 8/2016 | Fripp et al. | |
| 2016/0376490 A1* | 12/2016 | Salla | E21B 43/16 166/305.1 |
| 2018/0066176 A1* | 3/2018 | Eluru | C08K 3/346 |

FOREIGN PATENT DOCUMENTS

WO    2014066268 A3    6/2014

OTHER PUBLICATIONS

"Mechanically Reinforced Phosphoric Acid Doped Quaternized Poly(ether ether ketone) Membranes via Cross-linking with Functionalized Graphene Oxide" authored by Zhang et al. and published in Chemical Communications (2014) 50, 15381.*
Shi, et al. "High Temperature Shape Memory Polymers", Macromolecules, American Chemical Society, 2013; 8 pages.
Shi, Ying "High Temperature Shape Memory Polymers & Ionomer Modified Asphalts", A Dissertation Presented to the Graduate Faculty of The University of Akron, 2013; 211 pages.
Heo et al. "The effect of sulfonated graphene oxide on Sulfonated Poly (Ether Ehter Ketone) membrane for direct methanol fuel cells", Journal of Membrane Sciene 425-426 (2013) pp. 11-22.
International Search Report, International Application No. PCT/US2017/044142, dated Nov. 8, 2017, Korean Intellectual Property Office; International Search Report 4 pages.
International Written Opinion, International Application No. PCT/US2017/044142, dated Nov. 8, 2017, Korean Intellectual Property Office; International Written Opinion 5 pages.
Lee et al. "Preparation of new self-humidifying composite membrane by incorporating graphene and phosphotungstic acid into sulfonated poly(ether ether ketone) film", International Journal of Hydrogen Energy 39 (2014) 17162-17177.

* cited by examiner

*Primary Examiner* — Marc S Zimmer
(74) *Attorney, Agent, or Firm* — Cantor Colburn LLP

(57) ABSTRACT

A downhole tool for controlling the flow of a fluid in a wellbore comprises: an annular body having a flow passage therethrough; a frustoconical element disposed about the annular body; a sealing element carried on the annular body and configured to engage a portion of the frustoconical element; and a bottom sub disposed about the annular body; wherein at least one of the frustoconical element and the bottom sub comprise a polymeric composite that includes: a polymer component comprising one or more of the following: a poly(ether ether ketone); or an epoxy, and a filler crosslinked with the polymer component.

26 Claims, 1 Drawing Sheet

POLYMERIC COMPOSITES AND ARTICLES FORMED THEREOF

BACKGROUND

Frac plugs are commonly used downhole tools. Frac plugs can isolate zones in a well, allowing pressurized fluids to treat the target zone or isolated portion of a formation. In operation, forces apply to components of a frac plug and urge a sealing element to deform and fill a space between the plug and a casing. The setting load can be as high as 60,000 lbf. Upon setting, the plug may be subjected to high or extreme pressure conditions. Accordingly, plugs including various components thereof must be capable of withstanding high pressures or forces during the setting and subsequent fracturing operations. To increase the compressive strength of plug components, filament winding or filler orientation techniques have been used to create composite materials they are made of. However, the cost may be less than desirable due to high cost of these techniques and subsequent machining procedure. Accordingly, there is a continuing need in the art for tools or components of tools that have high compressive strength and are cost effective. It would be a further advantage if such tools or components can be conveniently manufactured.

BRIEF DESCRIPTION

A polymeric composite comprises a poly(ether ether ketone); and a filler; wherein the poly(ether ether ketone) is crosslinked with the filler.

A downhole article comprises a polymeric composite that includes: a polymer component comprising one or more of the following: a poly(ether ether ketone); or an epoxy, and a filler; wherein the filler is crosslinked with the polymer component.

Also disclosed is a downhole tool comprising the component. In an embodiment, a downhole tool for controlling the flow of a fluid in a wellbore comprises: an annular body having a flow passage therethrough; a frustoconical element disposed about the annular body; a sealing element carried on the annular body and configured to engage a portion of the frustoconical element; and a bottom sub disposed about the annular body; wherein at least one of the frustoconical element and the bottom sub comprise a polymeric composite that includes: a polymer component comprising one or more of the following: a poly(ether ether ketone); or an epoxy, and a filler crosslinked with the polymer component.

BRIEF DESCRIPTION OF THE DRAWINGS

The following description should not be considered limiting in any way. With reference to the accompanying drawings, like elements are numbered alike.

DETAILED DESCRIPTION

Figure 1:
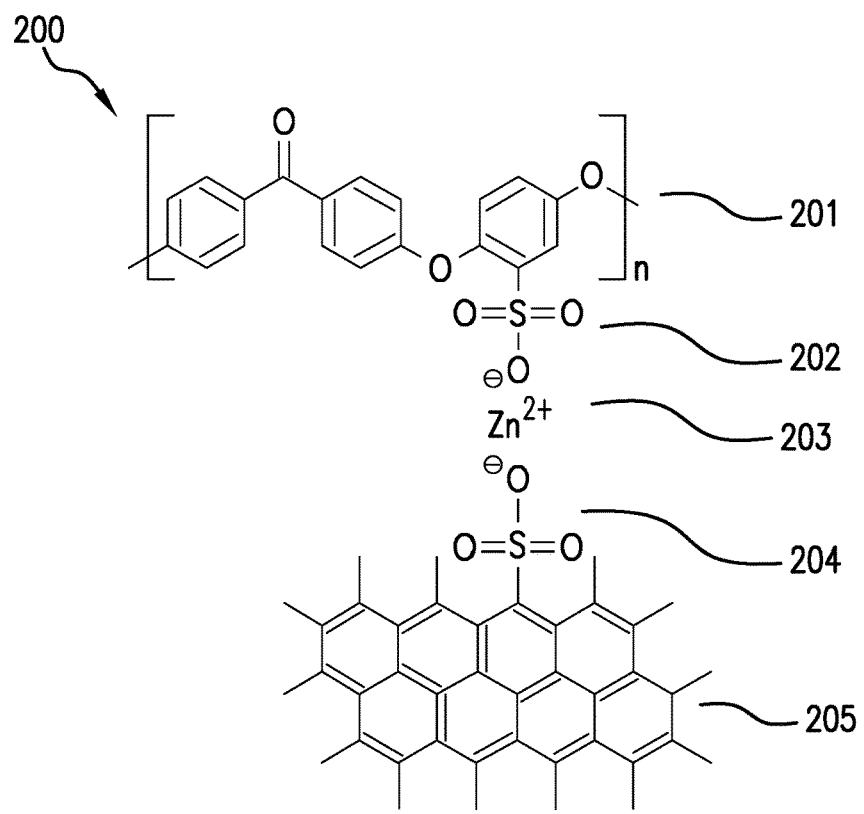
FIG. 1 illustrates an exemplary polymeric composite according to an embodiment of the disclosure.

The inventors have discovered downhole articles having improved strength and ductility. The articles contain a polymeric composite and can be used in tools such as frac plugs and bridge plugs to control fluid flow. More than one component can contain the polymeric composite.

The polymeric composites comprise a polymer component and a filler, wherein the polymer component is crosslinked with the filler. The polymer component includes a poly(ether ether ketone) or an epoxy. More than one material can be used in both the polymer component and the filler. The weight ratio of the polymeric component to the filler is about 100:1 to about 100:40 or about 100:5 to about 100:20.

The filler can be in the particle form or fiber form. In an embodiment, the filler comprises nanoparticles. Nanoparticles are generally particles having an average particle size, in at least one dimension, of less than one micrometer. Particle size, including average, maximum, and minimum particle sizes, may be determined by an appropriate method of sizing particles such as, for example, static or dynamic light scattering (SLS or DLS) using a laser light source. Nanoparticles may include both particles having an average particle size of 250 nm or less, and particles having an average particle size of greater than 250 nm to less than 1 micrometer (sometimes referred in the art as "sub-micron sized" particles). In an embodiment, a nanoparticle may have an average particle size of about 1 to about 500 nanometers (nm), specifically 2 to 250 nm, more specifically about 5 to about 150 nm, more specifically about 10 to about 125 nm, and still more specifically about 15 to about 75 nm.

As used herein, a poly(ether ether ketone) can be a sulfonated poly(ether ether ketone) or a non-sulfonated poly(ether ether ketone). A sulfonated poly(ether ether ketone) comprises a sulfonate group —$SO_3O$— or —$SO_3H$. A sulfonating agent can be used to introduce sulfonate groups onto the polymer chains, either directly or by polymerizing functionalized monomers. The degree of sulfonation can be controlled by reaction time and temperature. In an embodiment, sulfonated poly(ether ether ketone) is synthesized via a mono-substitution reaction of poly(ether ether ketone) in concentrated sulfuric acid. The epoxy is not limited and can be any epoxy known in the art.

In a preferred embodiment, the polymeric composites comprise a sulfonated poly(ether ether ketone); and a functionalized filler comprising a filler modified with a functional group; wherein the sulfonated poly(ether ether ketone) is crosslinked with the functionalized filler via a multivalent metal cation. In an embodiment, a sulfonate group on the sulfonated poly (ether ether ketone) is bonded to the functional group on the functionalized filler via the multivalent metal cation. The multivalent metal cations include, but are not limited to, $Zn^{2+}$, $Al^{3+}$, $Ba^{2+}$, $Zr^{4+}$, or a combination comprising at least one of the foregoing. Without wishing to be bound by theory, it is believed that there are two possible crosslinking mechanisms. One is the ionic crosslinking which occurs as a result of achieving electrical neutrality in the composite among the sulfonate groups of a sulfonated poly(ether ether ketone), the functional group of a functionalized filler, and multivalent metal ions. The other is the physical crosslinking due to dipole-dipole association. This association produces ionic aggregation, e.g., ionic clusters and provides multifunctional crosslinks.

Advantageously, although a sulfonated poly (ether ether ketone) is swellable in an aqueous based solution, the polymeric composites containing the sulfonated poly(ether ether ketone) crosslinked with metal cations demonstrate low water uptake levels. In addition, sulfonating of poly (ether ether ketone) increases its glass transition temperature, crosslinking of sulfonated poly(ether ether ketone) (i.e. SPEEK) with metal cations further improves glass transition temperature as compared to the neat polymer. This modification also increases storage modulus of the system compared to the neat polymer. Furthermore, composites of SPEEK with nanofillers can improve its mechanical properties such as modulus and strength.

Functionalized filler include functionalized carbon, functionalized clay, functionalized halloysites, functionalized silicate, functionalized silica, or a combination comprising at least one of the foregoing. The carbon can be a fullerene, a carbon nanotube, carbon nanofiber, graphite, graphene, graphene oxide, nanodiamond, carbon black, or combinations comprising at least one of the foregoing. The functionalized clay, functionalized halloysites, functionalized silicate, and functionalized silica can be functionalized nanoclay, functionalized nanohalloysites, functionalized nanosilicate, or functionalized nanosilica. In an exemplary embodiment, the functionalized filler includes functionalized carbon nanotubes. Carbon nanotubes are tubular fullerene structures having open or closed ends and which may be inorganic or made entirely or partially of carbon, and may include also components such as metals or metalloids. Nanotubes, including carbon nanotubes, may be single walled nanotubes (SWNTs) or multi-walled nanotubes (MWNTs).

The functional groups on the functionalized filler include one or more of the following: a sulfonate group; a phosphonic group; a carboxy group (e.g., carboxylic acid groups); an amino; a hydroxyl group; or a thiol group. The degree of functionalization can vary from 1 functional group for every 5 carbon centers to 1 functional group for every 100 carbon centers depending on the functional group.

As used herein, functionalization includes both non-covalent functionalization and covalent functionalization. Non-covalent functionalization is based on van der Walls forces, hydrogen bonding, ionic interactions, dipole-dipole interactions, hydrophobic or π-π interactions. Covalent functionalization means that the functional groups are covalently bonded to the filler, either directly or via an organic moiety. Any known methods to functionalize the fillers can be used. For example, surfactants and ionic liquids having functional groups disclosed herein can be used to non-covalently functionalize the fillers. Various chemical reactions can be used to covalently functionalize the fillers. Exemplary reactions include, but are not limited to, oxidization, reduction, amination, free radical additions, CH insertions, cycloadditions, or a combination comprising at least one of the foregoing. In some embodiments, the fillers are covalently functionalized. Covalently functionalized carbon is specifically mentioned. As a specific example, the functionalized filler comprises carbon nanotubes functionalized with a sulfonate group, a carboxylic acid group, or a combination thereof.

The functional groups on the functionalized filler may react directly and/or have physical interactions with other components in the polymeric composite, including reactive functional groups that are present in the polymeric or monomeric constituents, leading to improved tethering/reaction of the functionalized carbon with the polymeric matrix.

In another embodiment, the polymeric composites comprise poly(ether ether ketone) and a filler comprising graphene, carbon nanotubes, or a combination thereof, wherein the poly(ether ether ketone) is crosslinked with the filler via an organic crosslinking agent such as an aromatic crosslinking agent. Exemplary organic crosslinking agents include those formed from a polyol of formula (I) with an activator comprising an organic acid, an acetate, or a combination thereof:

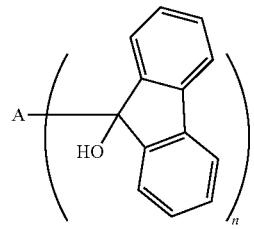

formula (I). In formula (I), A is an aromatic moiety and n is about 2 to about 10. As used herein, a polyol includes a diol. A specific example of the polyol of formula (I) is 9,9'-(biphenyl-4,4'-diyl) bis (9H-fluoren-9-ol). Exemplary organic acids include glacial acetic acid, formic acid, benzoic acid, or a combination comprising at least one of the foregoing. The exemplary acetate includes lithium acetate hydrate, sodium acetate, potassium acetate, or a combination comprising at least one of the foregoing. Detailed descriptions for the crosslinking agents can be found in WO 2014/066268, the content of which is incorporated herein by reference in its entirety.

When the filler comprises carbon nanotubes, the crosslinks are formed between a carbon atom on the backbone of the poly(ether ether ketone) and a carbon atom on the surface of carbon nanotubes. When the filler comprises graphene, the crosslinks are formed between a carbon atom on the backbone of the poly(ether ether ketone) and a carbon atom on the edge of graphene. The poly(ether ether ketone) can be functionalized or non-functionalized. The carbon nanotubes and the graphene can be functionalized or non-functionalized. In particular, graphene can be functionalized with an electron donating group such as —OH, —NH$_2$, —NRH, —NR$_2$H, —OR, and the like where R is an organic moiety to facilitate the crosslinking between the poly(ether ether ketone) and the filler.

In yet another embodiment, the polymeric composites comprise an epoxy crosslinked with a functionalized filler as described herein.

An exemplary polymeric composite according to an embodiment of the disclosure is shown in FIG. 1. As shown in FIG. 1, the polymeric composite 200 includes a sulfonated poly(ether ether ketone) 201 and a functionalized carbon nanotube 205, wherein a sulfonate group 202 of the sulfonated poly(ether ether ketone) 201 is bonded to the sulfonated functional group 204 of the functionalized carbon nanotube 205 via a multivalent metal ion 203.

The polymeric composites can also include other, more common filler particles that are not functionalized such as carbon black, mica, glass fiber, carbon fiber, carbon nanotubes, graphene, graphene oxide; graphite; nanodiamonds; halloysites, nanoclays, nanosilica, and the like, and combinations thereof.

When the polymeric component is an epoxy, the composites can be prepared by mixing the polymer and the filler. When the polymeric component is a sulfonated poly(ether ether ketone), the composites are prepared by first dissolving a sulfonated poly(ether ether ketone) in a solvent to form a solution or dispersion, then combining the solution or dispersion with the filler such as a functionalized carbon, and a multivalent metal salt to form the composites. Alternatively, the composites are made by mixing a sulfonated poly(ether ether ketone), the filler such as functionalized carbon, and a multivalent metal salt at melt conditions to form the composites. When the polymeric composites comprise poly(ether ether ketone) crosslinked with graphene, carbon nanotubes, or a combination comprising at least one of the foregoing, the composites are made by reacting poly(ether ether ketone), a polyol of formula (I), and an activator as disclosed herein. The reaction can be conducted sequentially. For example, a polyol of formula (I) can be reacted with an activator first to form a crosslinking agent, which is then contacted with poly(ether ether ketone) to form the polymeric composites. Alternatively, the reaction can be conducted simultaneously. In other words, a poly(ether ether ketone) can be combined with a polyol of formula (I) and an activator to prepare the polymeric composites.

The polymeric composites can optionally contain a plasticizer such as a fatty acid or a salt thereof. Without desiring to be bound by example, such chemical compounds can include oleic acid, stearic acid, and montanic acid, and their salts, specifically sodium oleate and zinc oleate. The fatty acid or a salt thereof can be present in an amount of about 0.1 wt. % to about 50 wt. %, about 0.1 wt. % to about 25 wt. % or about 0.1 wt. % to about 10 wt. %, or about 0.1 wt. % to about 5 wt. %, each based on the total weight of the polymeric composites.

The polymeric composites may be used to form all or a portion of an article. The downhole articles comprising the polymeric composite can be a single component article. In an embodiment, the downhole articles inhibit flow. In another embodiment, the downhole articles are pumpable within a downhole environment.

Illustrative articles that inhibit flow include seals, compression packing elements, expandable packing elements, O-rings, bonded seals, bullet seals, sub-surface safety valve seals, sub-surface safety valve flapper seal, dynamic seals, V-rings, back up rings, drill bit seals, electric submersible pump seals.

Illustrative articles that are pumpable within a downhole environment include plugs, bridge plugs, wiper plugs, frac plugs, components of frac plugs, polymeric plugs, disappearing wiper plugs, cementing plugs, swabbing element protectors, buoyant recorders, pumpable collets.

In an embodiment, the element is a packer element, a blowout preventer element, a submersible pump motor protector bag, a sensor protector, a sucker rod, an O-ring, a T-ring, a gasket, a sucker rod seal, a pump shaft seal, a tube seal, a valve seal, a seal for an electrical component, an insulator for an electrical component, a seal for a drilling motor, a seal for a drilling bit, or porous media such as a sand filter, or other downhole elements.

The polymeric composites disclosed herein can be used to make components for downhole tools. Common compression molding, injection molding, solution casting, or extrusion techniques can be used. The components have a compressive strength of about 1 ksi to about 200 ksi, specifically about 10 ksi to about 50 ksi. Exemplary components include a frustoconical element or a bottom sub for a downhole tool. In another embodiment, combinations of the components are used together for the downhole tool to control fluid flow.

Figure 2:
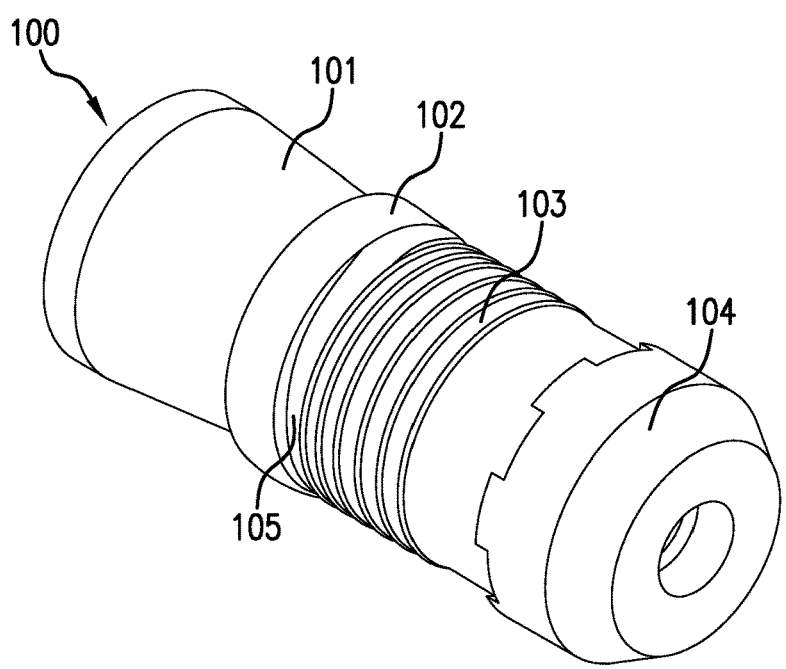
FIG. 2 illustrates an exemplary embodiment of a downhole tool that is effective to control fluid flow.

An embodiment of a downhole tool that controls fluid flow is show in FIG. 2. Referring to FIG. 2, an embodiment of a downhole 100 includes a frustoconical element 101 (also referred to as a cone). A bottom sub 104 is disposed at an end of the tool. A sealing element 102 is radially expandable in response to being moved longitudinally against the frustoconical element. One way of moving the sealing element 102 relative to the frustoconical element 101 is to compress longitudinally the complete assembly with a setting tool. (not shown) The tool 100 can also include a slip segment 103 and an abutment 105 intermediate of the sealing element 102 and the slip segment 103. The frustoconical element 101, the sealing element 102, the slip segment 103, the abutment 105, and the bottom sub 104 can all be disposed about an annular body (not shown), which is a tubing, mandrel, or the like.

The frustoconical element 101 includes a first end and a second end, wherein the first end is configured for engagement with the sealing element 102. Optionally, the downhole tool also includes a second slip segment (not shown), which is configured for contact with the frustoconical element 101. In an embodiment, the second slip is moved into engagement or compression with the second end of the frustoconical element 101 during setting.

The sealing element 102 is configured (e.g., shaped) to accept the frustoconical element 101 to provide force on the sealing element 102 in order to deform the sealing element 102 to form a seal with mating surfaces. Illustratively a compressive force is applied to the sealing element 102 by a frustoconical element 101 and setting tool disposed at opposing ends of the sealing element (not shown). To achieve the sealing properties, the sealing element has a percent elongation of about 10% to about 500%, specifically about 15% to about 300%, and more specifically about 15% to about 250%, based on the original size of the sealing element.

The abutment 105 prevents the extrusion of the sealing element. In an embodiment, the abutment is a backup ring.

The slip segment 103 comprises a slip body; an outer surface comprising gripping elements; and an inner surface configured for receiving an annular body. In an embodiment, the slip segment can be made of cast iron. The slip segment is configured to be radically altered to engage a structure to be isolated. In an embodiment, the slip segment has at least one surface that is radially alterable in response to longitudinal movement of the frustoconical element relative to the slip segment. The at least one surface being engagable with a wall of a structure positioned radially thereof to maintain position of at least the slip segment thus the downhole tool relative to the structure when engaged therewith.

In an embodiment, the bottom sub 104 is the terminus of a downhole tool (e.g., tool 100). In another embodiment, the bottom sub 104 is disposed at an end of a string. In certain embodiment, the bottom sub 104 is used to attach tools to a string. Alternatively, the bottom sub 104 can be used between tools or strings and can be part of a joint or coupling. In a non-limiting embodiment, a first end of the bottom sub 104 provides an interface with, e.g., the slip segment 103, and a second end of the bottom sub 104 engages a setting tool.

The downhole tool is configured to set (i.e., anchor) and seal to a structure such as a liner, casing, or closed or open hole in an earth formation borehole, for example, as is employable in hydrocarbon recovery and carbon dioxide sequestration applications.

During setting, tool 100 is configured such that longitudinal movement of the frustoconical element 101 relative to the sealing element 102 causes the sealing element 102 to expand radially into sealing engagement with a structure. In addition, a pressure applied to the tool urges the sealing element 102 toward the slip segment 103 to thereby increase both sealing engagement of the sealing element 102 with the structure to be separated and the frustoconical element 101 as well as increasing the anchoring engagement of the slip segment 104 with the structure.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A polymeric composite comprising:
    a sulfonated poly(ether ether ketone); and
    a filler functionalized to include a functional group;
    wherein the sulfonated poly(ether ether ketone) is crosslinked with the functionalized filler via a multivalent metal cation.

2. The polymeric composite of claim 1, wherein the filler is functionalized carbon, and a sulfonate group of the sulfonated poly(ether ether ketone) is bonded to the functional group of the functionalized carbon via the multivalent metal cation.

3. The polymeric composite of claim 1, wherein the functionalized filler comprises one or more of the following: carbon nanotubes; carbon nanofiber; graphene; graphene oxide; graphite; carbon black; nanodiamonds; fullerene; halloysites; clays; silicate; or silica; and the functional group on the functionalized filler comprises one or more of the following: a carboxy group; a sulfonate group; a phosphonic group; an amino group, a hydroxyl group; or a thiol group.

4. The polymeric composite of claim 1, wherein the weight ratio of the sulfonated poly(ether ether ketone) relative to the functionalized filler is about 100:1 to about 100:40.

5. A polymeric composite comprising:
    a poly(ether ether ketone); and
    a filler, wherein the filler comprises graphene, carbon nanotubes, or a combination thereof; and the poly(ether ether ketone) is crosslinked with the filler via an organic crosslinking agent.

6. The polymeric composite of claim 5, wherein the composite has crosslinks formed between a carbon on the backbone of the poly(ether ether ketone) and a carbon on an edge of the graphene via the organic crosslinking agent.

7. A polymeric composite comprising:
    a poly(ether ether ketone);
    a filler; and
    about 0.1 wt. % to about 50 wt. % of a fatty acid or a salt thereof, based on the total weight of the polymeric composite,
    wherein the poly(ether ether ketone) is crosslinked with the filler.

8. The polymeric composite of claim 1, further comprising a second filler that is not functionalized, the second filler comprising one or more of the following: carbon black, mica, glass fiber, carbon fiber, carbon nanotubes, graphene, graphene oxide; graphite; nanodiamonds; halloysites, nanoclays, nanosilica.

9. A downhole article comprising the polymeric composite that includes:
    a polymer component comprising one or more of the following: a sulfonated poly(ether ether ketone); or an epoxy, and
    a filler functionalized to include a functional group;
    wherein the filler is crosslinked with the polymer component via a multivalent metal cation.

10. The downhole article of claim 9, wherein the functionalized filler comprises one or more of the following: carbon nanotubes; carbon nanofiber; graphene; graphene oxide; graphite; carbon black; nanodiamonds; halloysites; clays; or silica; and the functional group on the functionalized filler comprises one or more of the following: a carboxy group; a sulfonate group; a phosphonic group; an amino group, a hydroxyl group; or a thiol group.

11. The downhole article of claim 9, wherein the filler comprises graphene, carbon nanotubes, or a combination thereof; and the poly(ether ether ketone) is crosslinked with the filler via an organic crosslinking agent.

12. The downhole article of claim 9, wherein the polymeric composite further comprises about 0.1 wt. % to about 50 wt. % of a fatty acid or a salt thereof, based on the total weight of the polymeric composite.

13. The downhole article of claim 9, wherein the downhole article inhibits flow; and the downhole article is selected from the group consisting of seals, compression packing elements, expandable packing elements, O-rings, bonded seals, bullet seals, sub-surface safety valve seals, sub-surface safety valve flapper seal, dynamic seals, V-rings, back up rings, drill bit seals, and electric submersible pump seals, and blowout preventer seals.

14. A downhole article comprising:
    a polymer component comprising one or more of the following: a sulfonated poly(ether ether ketone); or an epoxy; and
    a filler which is crosslinked with the polymer component;
    wherein the downhole article is pumpable within a downhole environment; and the downhole article is selected from the group consisting of plugs, bridge plugs, wiper plugs, frac plugs, components of frac plugs, polymeric plugs, disappearing wiper plugs, cementing plugs, swabbing element protectors, buoyant recorders, and pumpable collets.

15. A downhole tool for controlling the flow of a fluid in a wellbore, comprising the downhole article of claim 9.

16. The downhole tool of claim 15, further comprising a sealing element adjacent the downhole article.

17. The downhole tool of claim 15, wherein the downhole tool is a frac plug or a bridge plug.

18. A downhole tool for controlling the flow of a fluid in a wellbore, the tool comprising:
    an annular body having a flow passage therethrough;
    a frustoconical element disposed about the annular body;
    a sealing element carried on the annular body and configured to engage a portion of the frustoconical element; and
    a bottom sub disposed about the annular body;
    wherein at least one of the frustoconical element and the bottom sub comprise a polymeric composite that includes:
    a polymer component comprising one or more of the following: a poly(ether ether ketone); or an epoxy, and
    a filler crosslinked with the polymer component.

19. The downhole tool of claim 18, further comprises a slip segment disposed about the annular body intermediate of the sealing element and the bottom sub.

20. The downhole tool of claim 18, further comprising an abutment member adjacent the sealing element.

21. The downhole tool of claim 18, wherein at least one of the frustoconical element and the bottom sub comprise:
    a sulfonated poly(ether ether ketone);
    a functionalized filler having a functional group;

wherein the sulfonated poly(ether ether ketone) is crosslinked with the functionalized filler via a multivalent metal cation.

22. The downhole tool of claim 21, wherein a sulfonate group of the sulfonated poly(ether ether ketone) is bonded to the functional group of the functionalized carbon via the multivalent metal cation.

23. The downhole tool of claim 21 wherein the functionalized filler comprises one or more of the following: carbon nanotubes; carbon nanofiber; graphene; graphene oxide; graphite; carbon black; nanodiamonds; fullerene; halloysites; clays; silicate; or silica; and the functional group on the functionalized filler comprises one or more of the following: a carboxy group; a sulfonate group; a phosphonic group; an amino group, a hydroxyl group; or a thiol group.

24. The downhole tool of claim 18, wherein the weight ratio of the sulfonated poly(ether ether ketone) relative to the functionalized filler is about 100:1 to about 100:40.

25. The downhole tool of claim 18, wherein the polymeric composite further comprises about 0.1 wt. % to about 50 wt. % of a fatty acid or a salt thereof, based on the total weight of the polymeric composite.

26. The downhole tool of claim 21, wherein the multivalent metal cation comprises one or more of the following: $Zn^{2+}$; $Al^{3+}$; $Ba^{2+}$; or $Zr^{4+}$.

* * * * *